AUTOMATIC SWEEPING AND JAMMING RADIO EQUIPMENT

Filed Jan. 27, 1945 7 Sheets-Sheet 1

INVENTOR.
EVERARD M. WILLIAMS
BY
William D. Hall
ATTORNEY

May 5, 1959 E. M. WILLIAMS 2,885,543

AUTOMATIC SWEEPING AND JAMMING RADIO EQUIPMENT

Filed Jan. 27, 1945 7 Sheets-Sheet 2

INVENTOR.
EVERARD M. WILLIAMS
BY
William D. Hall
ATTORNEY

AUTOMATIC SWEEPING AND JAMMING RADIO EQUIPMENT

Filed Jan. 27, 1945 7 Sheets-Sheet 3

INVENTOR.
EVERARD M. WILLIAMS
BY William D. Hall
ATTORNEY

AUTOMATIC SWEEPING AND JAMMING RADIO EQUIPMENT

Filed Jan. 27, 1945 7 Sheets-Sheet 4

INVENTOR.
EVERARD M. WILLIAMS
BY
William D. Hall
ATTORNEY

AUTOMATIC SWEEPING AND JAMMING RADIO EQUIPMENT

Filed Jan. 27, 1945 7 Sheets-Sheet 5

INVENTOR.
EVERARD M. WILLIAMS
BY William D. Hall
ATTORNEY

INVENTOR.
EVERARD M. WILLIAMS
BY William D. Hall
ATTORNEY

INVENTOR.
EVERARD M. WILLIAMS
BY William D. Hall
ATTORNEY

United States Patent Office 2,885,543
Patented May 5, 1959

2,885,543

AUTOMATIC SWEEPING AND JAMMING RADIO EQUIPMENT

Everard M. Williams, State College, Pa.

Application January 27, 1945, Serial No. 574,941

9 Claims. (Cl. 250—13)

(Granted under Title 35, U.S. Code (1952), sec. 266)

The invention described herein may be manufactured and used by or for the Government for governmental purposes, without the payment to me of any royalty thereon.

This invention relates to radio devices and more particularly to a device for automatically sweeping the radio spectrum and jamming victim signals as they appear therein.

In the art of intentionally interfering with radio communication or jamming, as it is called in warfare, it is essential that a broad band of frequencies be monitored and that any signal appearing in the band be jammed without delay.

An object of the present invention is to combine a scanning receiver with a transmitter in which a band of frequencies is scanned continuously and in which the transmitter is made ready automatically and breaks into jamming signal whenever an enemy signal is intercepted by the scanning receiver.

Another object is to provide a system whereby coincidence between the frequencies of two signals, one of which is controllable, is obtained by means of coincidence of pulses in time.

Another object is to provide a system whereby a correspondence is set up between signals in a frequency spectrum and the timing of pulses in a time cycle, coincidence of frequencies being achieved by means of coincidence of pulses in the time cycle.

The above objects are augmented by further objects that are presented hereinafter as parts of the description of illustrative embodiments of the present invention that are shown schematically in the accompanying drawings, wherein.

Figure 1:
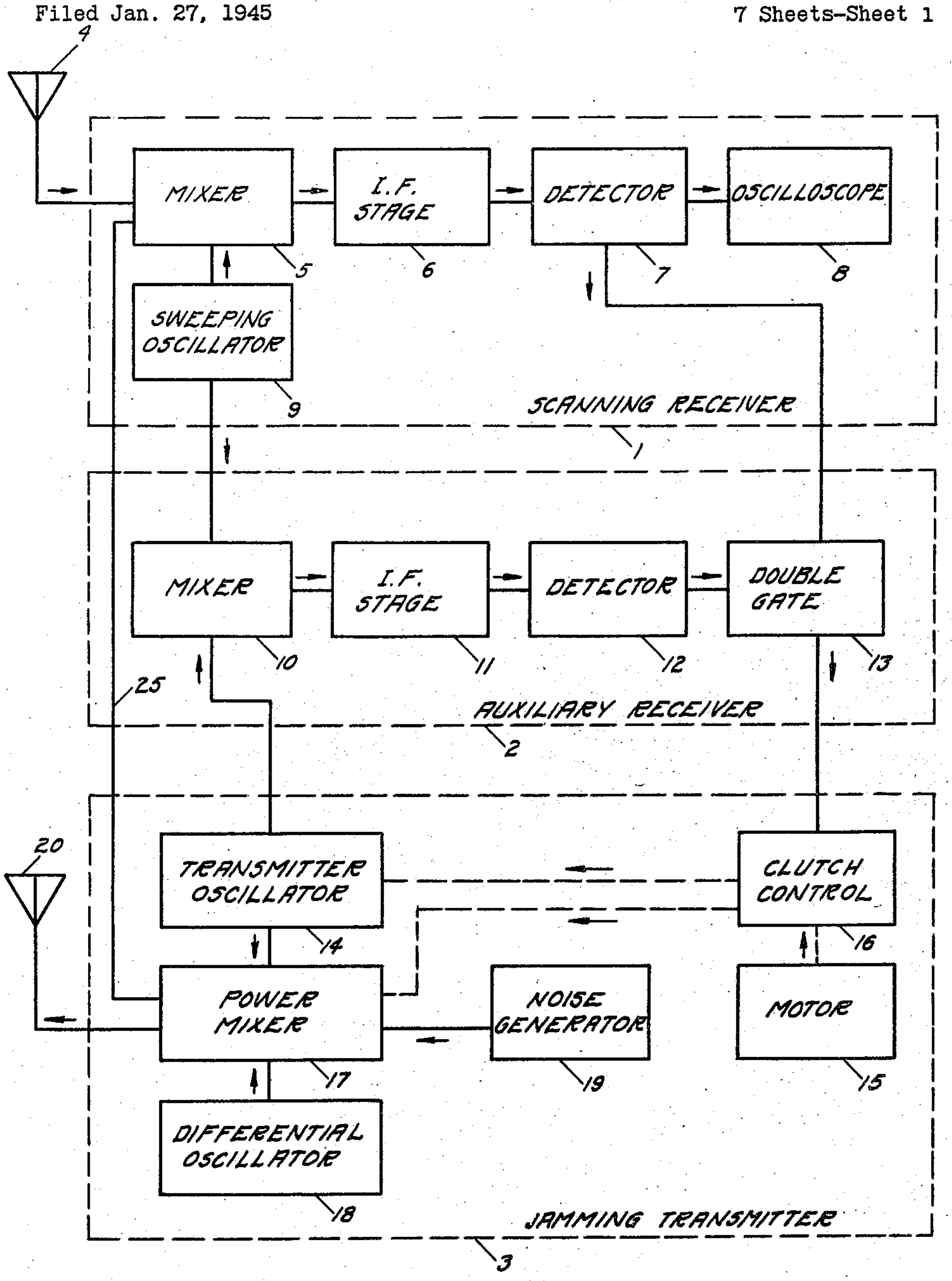
Fig. 1 is a block diagram of a device that embodies the present invention.

The embodiment of the present invention that is shown in Fig. 1 of the drawings comprises broadly a scanning receiver 1, an auxiliary receiver 2, and a jamming transmitter 3.

The scanning receiver 1 comprises a receiving antenna 4 that serves to feed intercepted signal to the device in a usual way. The intercepted signal is fed from the antenna 4 to a mixer 5. Signal from the mixer 5 is passed to and amplified by an intermediate frequency amplifier stage 6 that is tuned to a frequency denoted by $f_1$ and from which signal is passed through a detector 7 to a suitable presentation device, such as the cathode ray tube in an oscilloscope 8, or the like. The mixer 5 is supplied from a local heterodyne sweeping oscillator 9. The control of sweep voltage between the sweeping oscillator 9 and the oscilloscope 8 is omitted for purposes of simplicity in the presentation of the signal path direct.

The auxiliary receiver 2 comprises a mixer 10 that also is supplied from the sweeping oscillator 9 and from an oscillator 14 in the transmitter 3. The mixer 10 feeds output through an intermediate frequency stage 11, that is tuned to a frequency $f_2$, and a detector 12 to a double gate 13. Output from the scanning receiver detector 7 is also applied to the double gate 13.

The jamming transmitter 3 comprises a sweeping transmitter oscillator 14 that feeds output to the mixer 10, as stated above. The transmitter oscillator 14 is operated by a motor 15 through a clutch control 16 as indicated by dotted lines therebetween. A power mixer 17 in the transmitter 3 combines a signal from a differential oscillator 18 with the signal that it receives from the transmitter oscillator 14 and radiates it, after it is noise modulated by a modulator 19, over a transmitting antenna 20.

In operation the scanning receiver 1 cyclically and continuously explores a predetermined band of frequencies by the rapid frequency sweep of the heterodyne sweeping oscillator 9. The scanning receiver 1 amplifies and detects any signal that may appear within the frequency band that it explores and that is intercepted by the receiving antenna 4. The time of the sweep of the scanning receiver 1 may illustratively be in the order of one second or other preferred period of time.

The frequency of a signal that is so received may be denoted by $f_s$ and the variable frequency of the local oscillator 9 be denoted by $f_0$; then a pulse of intermediate frequency signal, that is denoted by $f_1$, will be passed by the intermediate frequency stage 6 when momentarily $f_s-f_0=f_1$.

It will be noted that the position of a particular frequency in the frequency spectrum scanned by the scanning receiver 1 is put in correspondence with the time of the occurrence of a particular pulse in a time cycle, namely, the sweep cycle. It will be noted also that any signal that is received will be passed by the scanning receiver 1 for only a very brief period of time, the duration of the time period depending upon the width of the pass band of the intermediate frequency stage 6 of the scanning receiver 1.

If we assume that the time of the sweep of the scanning receiver 1 is one second, as previously noted, and if the pass band-width is one one hundredth of the frequency range that is covered by the scanning receiver 1, then the intercepted signal will be passed for one one hundredth of the time of sweep, or for one one hundredth part of one second. Each intercepted signal in the detector 7 of the scanning receiver 1 will have a corresponding output signal which will be a direct current pulse of one one hundredth of a second duration.

The range width of the frequency sweep $w$, of the heterodyne sweeping oscillator 9, may be expressed as the difference between an upper limiting frequency $f_b$ and a lower limiting frequency $f_a$, or $$w=f_b-f_a$$

The range of the scanning receiver 1 is then from $f_a+f_1$ to $f_b+f_1$, if the lower image frequencies are rejected, and the range width is the same, since $$(f_b+f_1)-(f_a+f_1)=f_b-f_a=w$$

The heterodyne sweeping oscillator 9 feeds to both mixers 5 and 10, in the scanning receiver 1 and in the auxiliary receiver 2, respectively, as previously stated. The mixer 10 mixes the heterodyne signal with signal from the transmitter oscillator 14. The output of the mixer 10 is fed to the intermediate frequency stage 11, which is tuned to the frequency $f_2$.

The transmitter oscillator 14 is made to continuously vary its frequency, $f_t$, over a range of frequencies that is of the same width $w$, as that of the heterodyne sweeping oscillator 9, but the limiting frequencies are made higher than those of the heterodyne sweeping oscillator 9 by the pass frequency of the intermediate frequency stage 11, so that the lower and upper limits of the range $(f_a+f_2)$ and $(f_b+f_2)$ respectively. The transmitting oscillator 14 sweeps very much slower than the local sweeping oscillator 9, for example in the ratio of 100 to 1.

Figure 2:
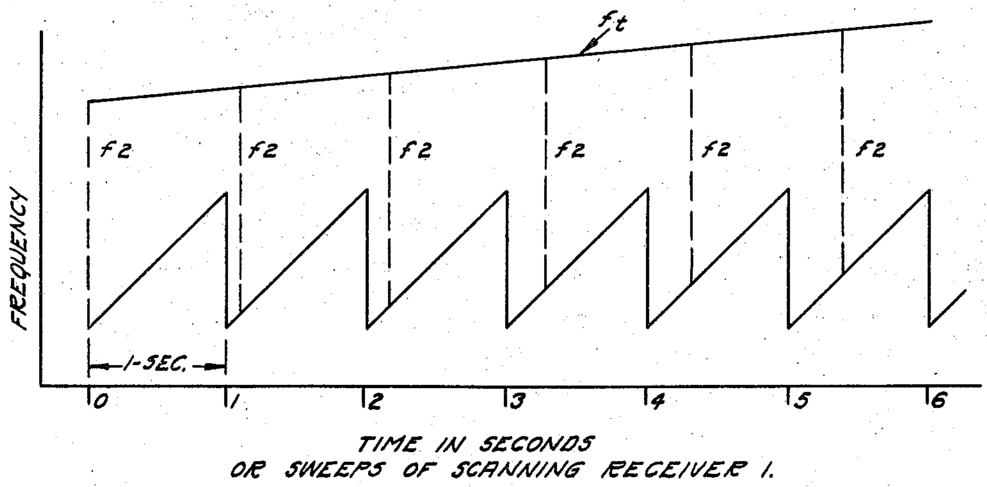
Fig. 2 is a diagrammatic graph that indicates the performance of the sweeping oscillator and of the transmitter oscillator portions of the device that is shown in Fig. 1.

The time-frequency graph that is shown in Fig. 2 of the drawings displays the inter-relationships between the variable frequency of the sweeping oscillator 9, designated by $f_0$, the variable frequency of the transmitter oscillator 14, designated by $f_t$, and the constant frequency $f_2$ to which the auxiliary receiver intermediate frequency stage 11 is tuned, on the basis of successive individual one second sweeps of the scanning receiver 1.

With reference to the graph shown in Fig. 2, it will be noted that once in each cycle of the heterodyne sweeping oscillator 9, a difference frequency between the variable frequency $f_t$ of the variable transmitting oscillator 14 and the variable frequency $f_0$ of the heterodyne sweep oscillator 9 will occur, such that $$f_t-f_0=f_2$$

It will be noted that once during each cycle of the sweeping oscillator 9 a signal will be passed thru the intermediate frequency stage 11 and the detector 12. This will appear in the output of detector 12 as a pulse of direct current. On the previous assumption of a pass band width in the intermediate frequency stage 11 of one one hundredth of the frequency range $w$, and of a one second sweep by the sweeping oscillator 9, it follows that the pulse output from the detector 12 will have a duration of one one hundredth of a second. As indicated on the graph in Fig. 2, these pulses occur one one hundredth of a second later in each succeeding sweep of the heterodyne sweeping oscillator 9.

If a signal of frequency $f_s$ is being received on the scanning receiver 1 during a cycle of the transmitter oscillator 14, corresponding pulses will be passed through the scanning receiver 1 at the particular phase of each cycle of the heterodyne sweeping oscillator 9 at which $$f_s-f_0=f_1$$

Periodically a time coincidence of pulses from the detector 7 and from the detector 12 will occur. Each time that this coincidence occurs the transmitting oscillator 14 is momentarily on a frequency of $f_t$ which equals the summation of $f_0$ and $f_2$ or $$f_t=f_0+f_2$$

The frequency $f_0$ of the heterodyne sweeping oscillator 9 then momentarily satisfies the equation $$f_0=f_s-f_1$$

and hence $$f_t=f_s+(f_2-f_1)$$

The pass frequency $f_1$ of the intermediate frequency stage 6 is chosen sufficiently remote from the pass frequency $f_2$ of the intermediate frequency stage 11 so that the intermediate frequency stage 6 passes no beat frequency that is formed between any frequency $f_0$ of the heterodyne sweep oscillator 9 and any frequency $f_t$ of the transmitter oscillator 14. In this manner, signal from the transmitter oscillator 14 is kept out of the scanning receiver 1.

Figure 3:
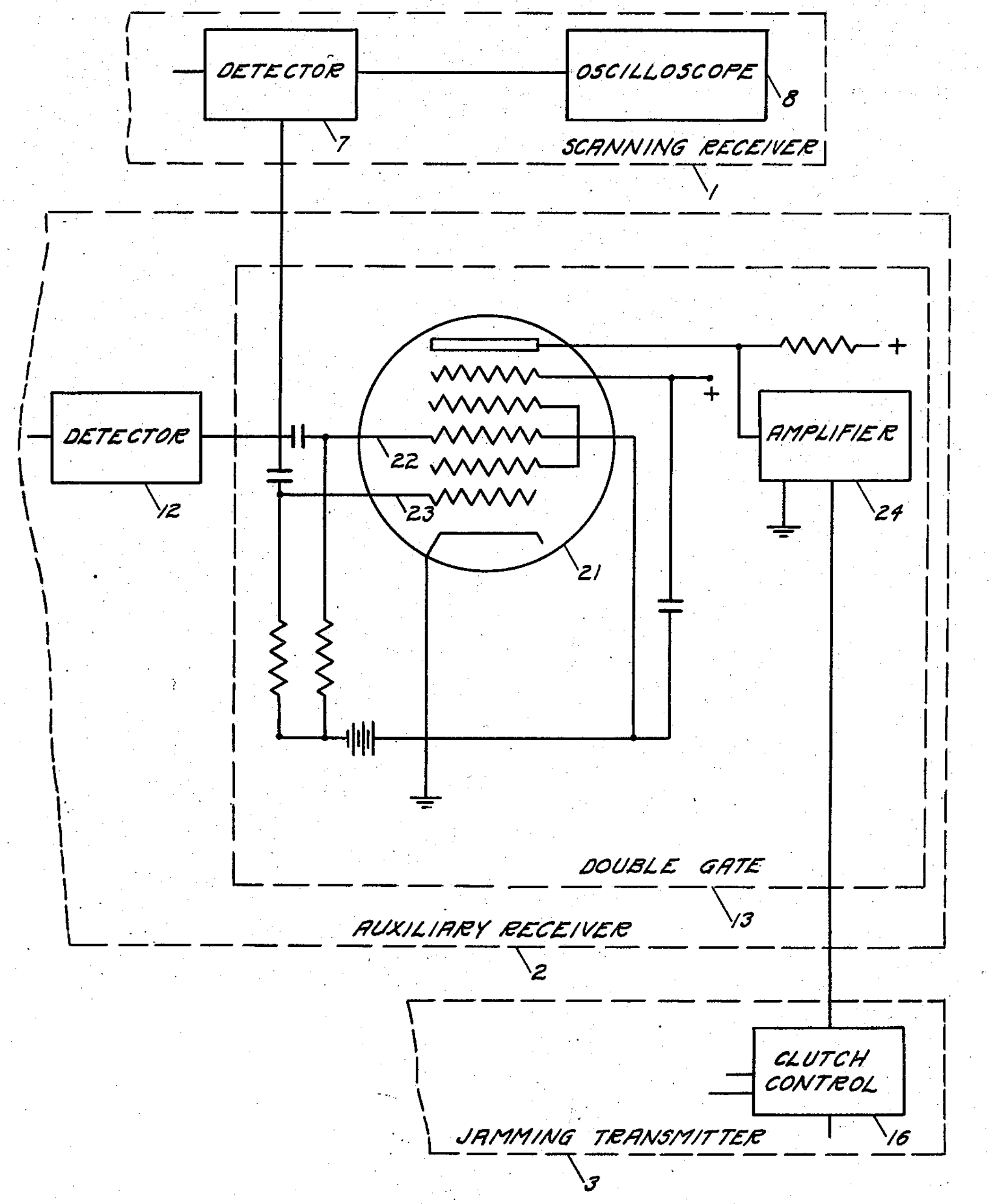
Fig. 3 is a circuit diagram of the double gate portion of the device that is shown in Fig. 1.

The details of the double gate 13 in the scanning receiver 1 are shown in Fig. 3 of the accompanying drawing. A pentagrid mixer tube 21 in the double gate 13 is connected in a usual manner, the less significant component parts not being specifically designated in the drawing. The preferred double gate 13 shown comprises the tube 21 that is provided with double control grids 22 and 23. Both of these control grids 22 and 23 are biased beyond cut off and are connected to the outputs of the auxiliary receiver detector 12 and of the scanning receiver detector 7, respectively. In the tube 21 no plate current flows unless both control grids 22 and 23 simultaneously receive positive signal voltages. These positive signal voltages are supplied simultaneously by the two detectors 7 and 12 only when the above coincidence relation between $f_t$ and $f_s+(f_2-f_1)$ holds. The coincidence of pulses, that is described above as accompanying the frequency coincidence, is marked by the double gate 13 passing a triggering pulse of signal to an amplifier 24 in the double gate 13. The amplifier 24 receives no signal except upon the occurrence of a pulse coincidence. Thus the establishment of equality, or coincidence, of two frequencies, $f_t$ and $f_s+(f_2-f_1)$ has been correlated with the coincidence of two pulses, one from the detector 7 in the receiver 1, and the other from the detector 12 in the auxiliary receiver 2. The device has thus converted a frequency coincidence into a time coincidence.

The amplifier 24 amplifies the received pulse to supply a trigger signal which operates the clutch control 16. The clutch control 16 disconnects the transmitter oscillator 14 from the motor 15 and stops the oscillator 14 on the frequency $f_t$ to which it is then tuned, that is, when $$f_t=f_s+(f_2-f_1)$$

as previously determined.

The clutch control 16 also simultaneously energizes the power mixer 17. The differential oscillator 18 supplies to the power mixer 17 a fixed frequency signal that is of a frequency of $f_2-f_1$, and this signal is combined in the power mixer 17 with the signal $f_t$ to reform a signal of the $f_t-(f_2-f_1)$, that is, $f_s$. This signal of the frequency $f_s$ is modulated by noise from the noise generator 19 and also amplified in the power mixer 17, and is then radiated over the transmitting antenna 20.

The signal of the frequency $f_s$, that is radiated from the antenna 20, is of the same frequency as that of the received signal $f_s$ and is operative to jam the received signal. In this manner the jamming transmitter 3 is brought to bear upon an enemy signal with a minimum of delay.

When the power mixer 17 comes on, a blanking voltage is applied along the conductor 25 to the scanning receiver 1 to reduce the sensitivity thereof and to prevent the transmitted jamming signal from overloading or injuring the scanning receiver 1 during the time in which the jamming transmitter is actively transmitting.

After an interval, the power mixer 17 turns off automatically; the blanking voltage thru the conductor 25 is removed from the scanning receiver 1 by the discontinuance of the power mixer 17; the clutch control 16 engages the motor 15; and a cycle of tuning the transmitter oscillator 14 recommences by operation of the motor 15 thru the engaged clutch control 16.

Figure 4:
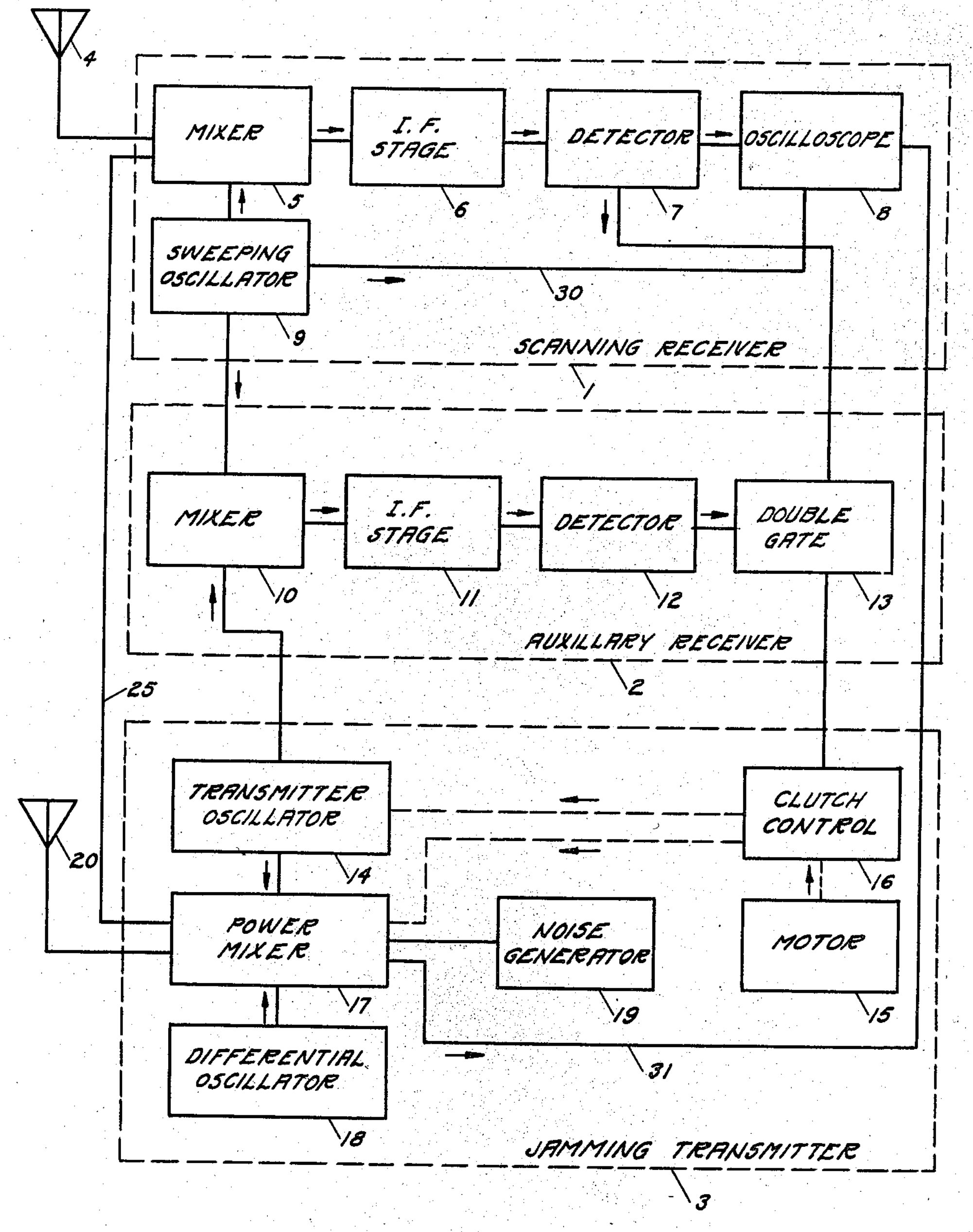
Fig. 4 is a block diagram of a modification in the present invention and particularly in the presentation system of the device that is shown in Fig. 1.

A modification of the present invention is shown in Fig. 4 of the accompanying drawing. In this modification of the circuit that is shown in Fig. 1, the connector 30, that extends between the heterodyne sweeping oscillator 9 and the oscillscope 8, in the scanning receiver 1, and a connection 31 between the oscilloscope 8 in the receiver 1, and the power mixer 17 in the transmitter 3, are shown.

In the operation of this modification, the time sweep for the oscilloscope 8 is synchronized with the frequency sweep of the heterodyne sweeping oscillator 9 by a control signal passing along the connector 30. Signals from the scanning receiver detector 7 are applied to the signal terminal of the oscilloscope 8. When the power mixer 17 comes on, a signal therefrom is applied along the connector 31 to the oscilloscope 8 in such a manner as to change the character of the presentation upon the screen of the cathode ray tube part of the oscilloscope 8 from a pip that extends upwardly from the base line thereon to a pip that extends downwardly from the base line. Wherever the jamming signal is in operation, the scanning receiver 1 is attenuated and the jamming signal is the only signal that is strong enough to be passed by the scanning receiver 1 and the only signal that is presented as a downwardly extending pip upon the screen of the cathode ray tube in the oscilloscope 8. This characteristic clearly distinguishes a jamming signal from an intercepted signal upon the screen of the cathode ray tube in the oscilloscope 8.

Figure 5:
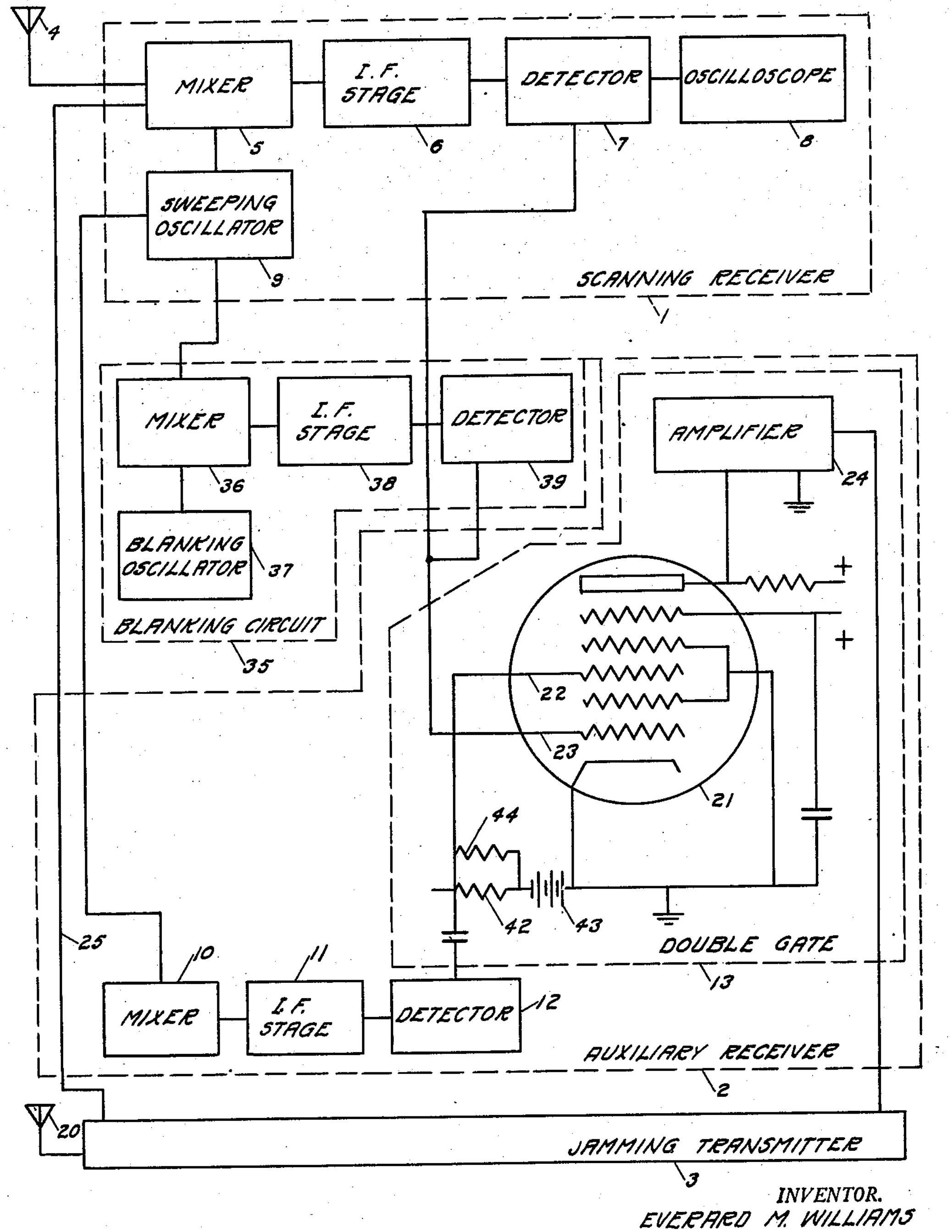
Fig. 5 is a block and circuit diagram of a modification of the device that is shown in Fig. 1, and containing a blanking circuit.

A second modification of the present invention is shown in Fig. 5 of the drawings. In this circuit a blanking circuit 35 for avoiding the jamming of friendly signals is shown coacting with the scanning receiver 1 and the auxiliary receiver 2 of the device.

In the circuit that is shown in Fig. 5, output from the heterodyne sweep oscillator 9 is fed to a mixer 36 in the blanking circuit 35, as well as to the mixer 10 in the auxiliary receiver 2. The mixer 36 in the blanking circuit 35 also receives output from a blanking oscillator 37 in the blanking circuit 35. The blanking circuit mixer 36 feeds output through an IF stage 38 to a detector 39 in the blanking circuit 35.

The output of the blanking circuit detector 39, or of the blanking circuit 35, is a direct current pulse that occurs once for each cycle of the sweeping oscillator 9. This output, in common with the output from the detector 7 of the scanning receiver 1, is fed to the control grid 23 of the pentagrid mixer tube 21 of the double gate 13.

In operation, the circuit that is shown in Fig. 5 functions in substantially the same manner as the circuits that are shown in Figs. 1 and 3 function, with the inclusion of the blanking circuit 35. The blanking oscilaltor 37 is tuned to, and remains at all times tuned to, the frequency $f_s$ of the friendly signal which is not to be jammed. The intermediate frequency stage 38 is tuned to the same frequency as the intermediate frequency stage 6. As the heterodyne sweeping oscillator 9 sweeps through its range of frequencies, a signal pulse passes thru the intermediate frequency stage 38 of the blanking circuit 35 at the same instant that the pulse of the received friendly signal passes thru the intermediate frequency stage 6 in the scanning receiver 1, since at that instant all the constituent frequencies in the two circuits are alike, each to each. Thus two pulses will simultaneously appear in the outputs of the detectors 7 and 39 and will be superimposed one upon the other in their common lead to the control grid 23. The detector 39 differs, however, from the detector 7 in that the detector 39 puts out a negative pulse whereas detector 7 puts out a positive pulse.

Thus, the negative blanking pulse from the blanking circuit 35 cancels the positive signal pulse from the scanning receiver 1 so that the grid 23 of the tube 21 remains at normal negative bias and the tube 21 of the double gate 13 is blocked from passing a trigger signal at the time that the friendly signal frequency, $f_s$, is scanned. In this manner the jamming transmitter 3 is prevented from going into operation against a friendly signal.

Figure 6:
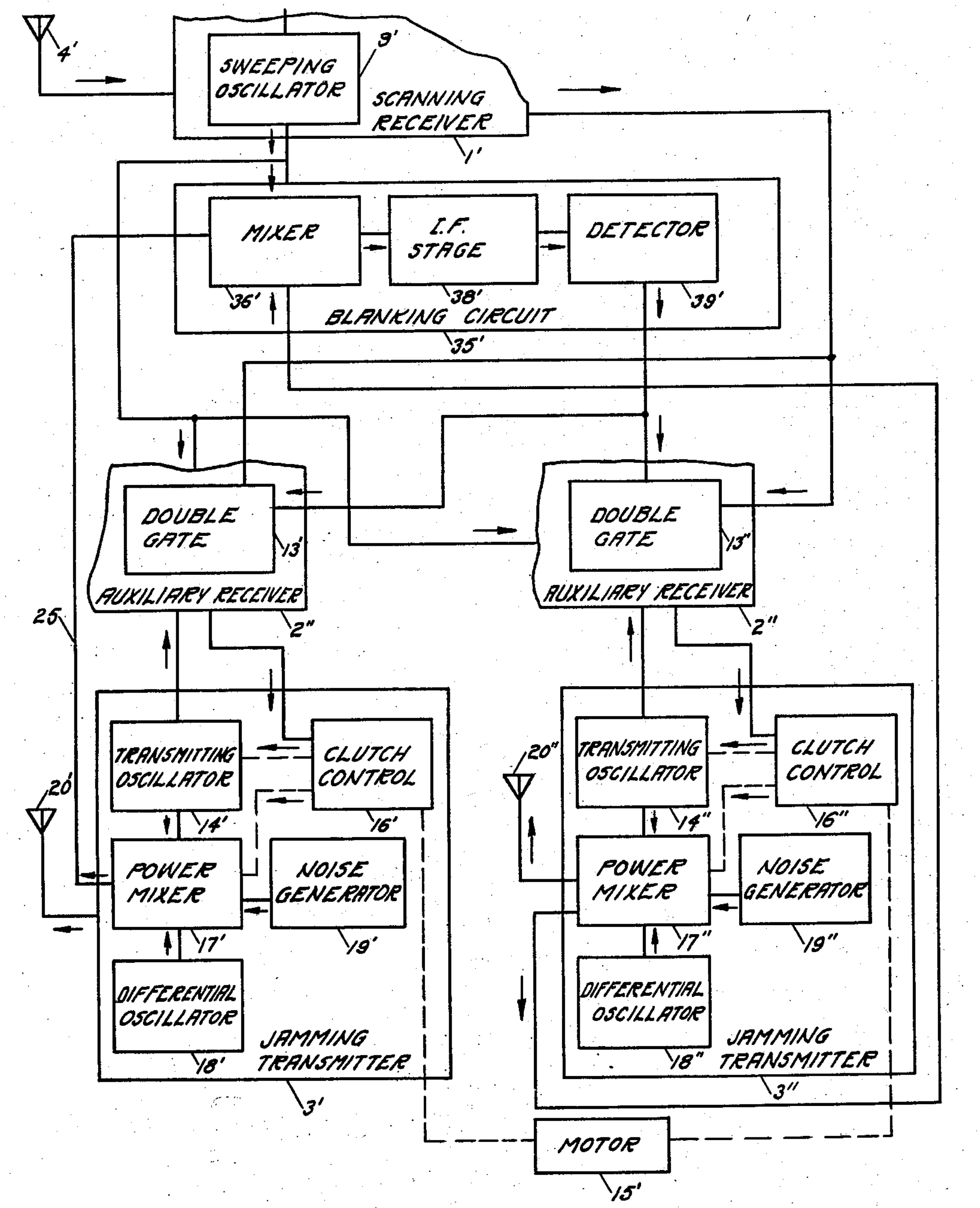
Fig. 6 is a block diagram with fragmentary parts therein of a second modification of the device that is shown in Fig. 1, and that comprises a plurality of transmitters.

An adaptation of the last described modification of the present invention for the simultaneous jamming of a plurality of enemy signals is shown in Fig. 6 of the accompanying drawings wherein parts of the previously described scanning receiver 1 and auxiliary receivers 2 have been deleted for purposes of simplicity.

In this multiple jamming circuit, signals that are intercepted by the antenna 4′ and the scanning receiver 1′ are fed in common therefrom to a desired plurality of auxiliary receiver 2′, 2″, etc. and jamming transmitter 3′, 3″, etc. combinations, as shown. A blanking circuit 35′, that is substantially a duplicate of the previously described blanking circuit 35 with the omission of the blanking oscillator 37 therefrom, is also common to the various auxiliary receiver-jamming transmitter combinations. The jamming transmitters 3′, 3″, etc. are substantially duplicates of the previously described jamming transmitter 3, but wherein the clutch controls 16′, 16″, etc. are preferably driven by a common motor 15′.

The mixer 36′ in the common blanking circuit 35′, receives a portion of each jamming signal from all of the power mixers 17′, 17″, etc. One or another of the jamming transmitters 3′, or 3″, etc. will be the first to be triggered into jamming transmission on one of the intercepted signal frequencies $f_s$. The transmitting oscillator 14′, or 14″, etc., receiving this signal from the signal passing auxiliary receiver 2′, or 2″, etc. locks upon this frequency $f_s$, through the operation of the involved clutch control 16′, or 16″, etc., and the corresponding power mixer 17′, or 17′, etc., is then energized. A jamming signal on this frequency $f_s$, is then emitted from the involved sending antenna 20′, or 20″, etc., a portion of the jamming signal being carried to the mixer 36′ of the blanking circuit 35′. This jamming signal is applied continuously as long as the involved transmitter 3′ or 3″, etc., continues to emit signal. A blanking signal of negative sign from the detector 39′ in the blanking circuit 35′ is carried in common to the double gates 13′, or 13′, etc.′, in the auxiliary receiver 2′, 2″, etc. respectively, as previously described for the form of the device that is shown in Fig. 5.

Each jamming transmitter 3′, 3″, etc. is provided with a separate transmitting oscillator 14′, 14″, etc. The transmitting oscillator sweeps are set so that each transmitting oscillator 14′, 14″, etc. commences its sweep at a different time so that no two transmitting oscillators are on the same frequency at the same time.

Each time a power mixer 17′, 17″, etc. commences transmission on a frequency $f'_s$ the blanking circuit 35′ applies a blanking signal to all of the double gates 13′, 13″, etc. against any further application of a signal of this frequency $f'_s$ to operate any or all of the double gates 13′, 13″, etc. As a result, no other jamming transmitter will be locked on this frequency $f'_s$.

The blanking signal from the detector 39′ is not effective to block the operation of that one double gate 13′ or 13″, etc. thru which the jamming signal $f'_s$ initiating the blanking signal was initiated. The reason for this is that the action of signal with double gate 13′, or 13″, etc. preceded the apearance of the blanking signal. The action of the double gates 13′, 13″, etc. to release the clutch control 16′, 16″, etc., respectively, is a trigger action and is not reversed by a subsequent cancellation of signal.

In a similar manner, a second jamming transmitter 3′, or 3″, etc. will lock upon a second intercepted signal frequency $f''_s$ and by a like sequence of operations a blanking signal is transmitted from the blanking circuit 35′ to the double gates 13′ or 13″, etc., and prevents any other jamming transmitter from locking upon this second frequency $f''_s$. In this way each jamming transmitter 3′, 3″, etc. automatically locks upon and jams a separate frequency of intercepted signal.

Figure 7:
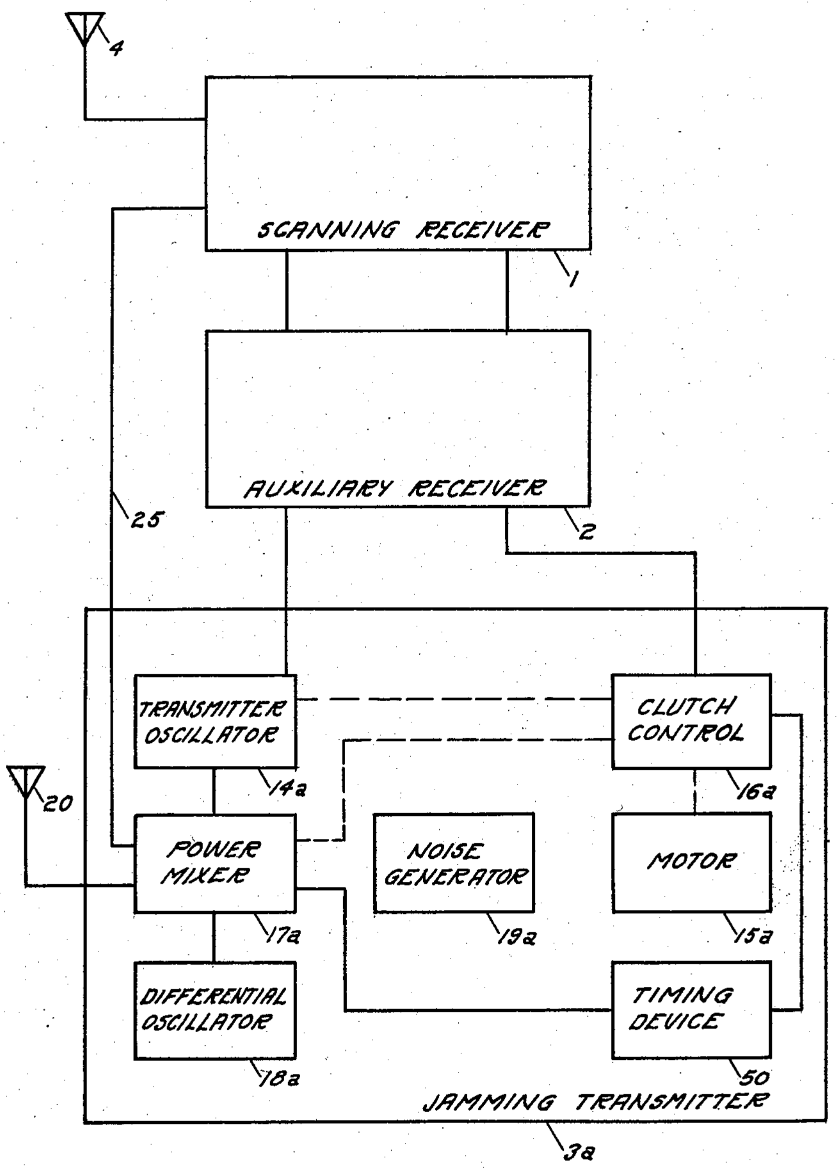
Fig. 7 is a block diagram of another modification of the device that is shown in Fig. 1, and containing a timing device.

The device that is contemplated hereby may be time controlled where desirable by the introduction of a suitable time control mechanism therein. Such a mechanism 50, as applied to the form of the device that is shown in Fig. 1 of the drawings, is shown in Fig. 7 thereof, as a part of the jamming transmitter 3*a*.

In the jamming transmitter 3*a*, the clutch control 16*a*, in addition to other functions described previously for the clutch control 16, sets the timing device 50 to running at the same time that the power mixer 17a is energized. The timing device 50, after running for a predetermined time, operates to deenergize the power mixer 17a and to engage the clutch control 16a so that the transmitter oscillator 14a begins to scan and the jamming transmitter is again set in condition to be tuned anew on a received signal from the scanning receiver 1 and to be set to jam it. The timing device 50 again starts to run, and so the cycle is continued.

It is to be understood that the circuit arrangements and the particular components therein that have been shown and described herein have been submitted for the purposes of illustrating and describing suitable operative embodiments of the present invention and that similarly functioning changes and modifications may be made therein without departing from the present invention.

What I claim is:

1. A receiver-transmitter, comprising in combination, a scanning receiver for receiving an intercepted signal, a detector in said scanning receiver, an oscillator in said scanning receiver, an auxiliary receiver supplementing said scanning receiver, said receivers having a common heterodyne sweep oscillator, a detector in said auxiliary receiver, a trigger tube in said auxiliary receiver, a mixer in said auxiliary receiver, the output of said heterodyne oscillator being coupled to said mixer, means for periodically producing coincident, discrete, direct-current output pulses from said detectors, a transmitter for emitting jamming signals, an oscillator in said transmitter having its output coupled to said auxiliary receiver mixer, and means in said transmitter for causing the emission of a signal at the frequency of an extraneous signal intercepted by said scanning receiver upon the application of coincident, direct-current pulses from said scanning receiver detector and said auxiliary receiver detector to said auxiliary receiver trigger tube and the passing of a triggering pulse from said trigger tube to said transmitter means.

2. A receiver-transmitter system comprising in combination a scanning receiver for scanning a predetermined range of radio frequencies for detecting the presence of a signal therein, an auxiliary receiver supplementing said scanning receiver and said auxiliary receiver and said scanning receiver having a common heterodyne sweep oscillator, means for periodically producing coincident, discrete, direct-current output pulses from said receivers for each sweep cycle of said heterodyne oscillator, a trigger tube responsive only to said coincident pulses, a transmitter including a mixer, and means in said transmitter and activated by the output of said trigger tube for causing said mixer to provide a signal for transmission of the same frequency as a signal intercepted by said scanning receiver.

3. A receiver-transmitter system comprising in combination a scanning receiver for intercepting signals within a predetermined range of frequencies, first and second sweep oscillators, the sweep cycle of said second sweep oscillator being an integral multiple of that of said first oscillator, means for combining the output of said first oscillator with said intercepted signals to produce a first intermediate frequency, an auxiliary receiver having at least one mixer stage, means for combining the outputs of said first and second oscillators in said mixer stage to produce a second intermediate frequency, means for producing coincident, discrete, direct-current output pulses from said receivers for each sweep cycle of said first oscillator, a trigger tube responsive only to said coincident pulses for producing a trigger pulse, and a transmitter energized by said trigger pulse to transmit jamming signals.

4. A receiver-transmitter system comprising in combination a scanning receiver for scanning a predetermined range of frequencies and detecting intercepted signals, an auxiliary receiver supplementing said scanning receiver, said auxiliary receiver and said scanning receiver having a common heterodyne sweep oscillator, means for periodically producing coincident, discrete, direct-current output pulses from said receivers, a trigger tube, means for actuating said trigger tube to produce a triggering pulse upon a coincidence of said direct-current pulses, a transmitter for emitting jamming signals at the frequency of a signal intercepted by said scanning receiver, and means for causing said transmitter to emit said jamming signals concurrently with the formation of said triggering pulse.

5. A receiver-transmitter system comprising in combination a scanning receiver for intercepting signals within a predetermined range of frequencies and identifying signals intercepted therein, an auxiliary receiver, said receivers having a common heterodyne sweep oscillator, means for periodically producing coincident, discrete, direct-current output pulses from said receivers for each sweep cycle of said heterodyne oscillator, said direct-current pulses corresponding to one of said intercepted signals, and a transmitter responsive only to said coincident, direct-current pulses to produce jamming signals at the frequency of said intercepted signals.

6. A receiver-transmitter system comprising in combination a scanning receiver for intercepting signals within a predetermined range of frequencies and including a heterodyne sweep oscillator for producing a first intermediate frequency, an auxiliary receiver having at least one mixer stage, a transmitter for emitting jamming signals at the frequency of a signal intercepted by said scanning receiver, said transmitter including a transmitter oscillator having its output frequency periodically swept through a predetermined range of frequencies, the outputs of said heterodyne sweep oscillator and said transmitter oscillator being combined in said mixer stage to produce a second intermediate frequency, means for producing coincident, direct-current output pulses from said receivers when the output frequency of said transmitter oscillator bears a predetermined relation with respect to the frequency of said intercepted signal and the difference between said intermediate frequencies, and means responsive only to said coincident pulses to energize said transmitter whereby a jamming signal is transmitted at the frequency of said intercepted signals.

7. A receiver-transmitter system comprising in combination a scanning receiver and an auxiliary receiver having a common heterodyne sweep oscillator, each of said receivers having separate mixer and detector circuits, a transmitter including an oscillator, a power mixer, and a differential oscillator providing a constant frequency output, said transmitter oscillator having its frequency output periodically swept through a predetermined range of frequencies and having its output coupled simultaneously to the mixer circuit of said auxiliary receiver and to said power mixer, said differential oscillator having its output coupled to said power mixer, means for periodically producing coincident, direct-current output pulses from said receivers, means responsive only to said coincident pulses to produce a triggering pulse for energizing said power mixer, the output of said transmitter oscillator and said differential oscillator being combined in said power mixer to produce a jamming signal having a frequency equal to that of a signal intercepted by said scanning receiver.

8. A receiver-transmitter system comprising in combination a scanning receiver including a heterodyne sweep oscillator for intercepting signals within a predetermined range of frequencies, said heterodyne oscillator having a predetermined sweep cycle, the output of said oscillator combining with intercepted signals to produce a first intermediate frequency, a transmitter including an oscillator having its output frequency periodically swept through a predetermined sweep range of frequencies, the sweep cycle of the transmitter oscillator being an integral multiple of said heterodyne oscillator sweep cycle, an auxiliary receiver having at least one mixer stage, means for combining the outputs of said heterodyne oscillator and said transmitter oscillator in said mixer stage to produce a second intermediate frequency, means for producing coincident, direct-current pulses from said receivers when the output frequency of said transmitter oscillator is equal to the frequency of said intercepted signal plus the difference between said first and second intermediate frequencies, a trigger tube responsive only to said coincident pulses to produce a trigger pulse, means for causing said transmitter to emit jamming signals concurrently with the formation of said trigger pulse, and means for distinguishing between said jamming signals and said intercepted signal.

9. A receiver-transmitter system comprising in combination a scanning receiver for intercepting signals within a predetermined range including a heterodyne sweep oscillator, the output of said oscillator combining with an intercepted signal to produce a first intermediate frequency, a transmitter including an oscillator, a power mixer, and a differential oscillator, said power mixer adapted to combine the outputs of said transmitter oscillator and said differential oscillator, an auxiliary receiver including at least one mixer stage, means for combining the outputs of said heterodyne oscillator and the transmitter oscillator in said mixer stage to produce a second intermediate frequency, said differential oscillator adapted to produce a frequency equal to the difference of said intermediate frequencies, means for producing coincident, direct-current pulses from said receivers when the output frequency of said transmitter oscillator is equal to the frequency of said intercepted signal plus the difference between said first and second intermediate frequencies, a trigger tube responsive only to said coincident pulses to produce a trigger pulse and means responsive to said trigger pulse for energizing said power mixer whereby a jamming signal is generated, said jamming signal having a frequency coincident with the frequency of said intercepted signal.

References Cited in the file of this patent

UNITED STATES PATENTS

| | | |
|---|---|---|
| 2,209,273 | Hills | July 23, 1940 |
| 2,363,583 | Gilman | Nov. 28, 1944 |
| 2,412,991 | Labin | Dec. 24, 1946 |
| 2,418,139 | Preisman | Apr. 1, 1947 |
| 2,447,392 | Byrne | Aug. 17, 1948 |
| 2,452,601 | Ranger | Nov. 2, 1948 |